US007581304B2

(12) United States Patent
Lykowski

(10) Patent No.: US 7,581,304 B2
(45) Date of Patent: Sep. 1, 2009

(54) METHOD OF FORMING A SPARK PLUG WITH MULTI-LAYER FIRING TIP

(75) Inventor: James D. Lykowski, Temperance, MI (US)

(73) Assignee: Federal-Mogul World Wide, Inc., Southfield, MI (US)

( * ) Notice: Subject to any disclaimer, the term of this patent is extended or adjusted under 35 U.S.C. 154(b) by 83 days.

(21) Appl. No.: 11/602,028

(22) Filed: Nov. 20, 2006

(65) Prior Publication Data

US 2007/0130751 A1 Jun. 14, 2007

Related U.S. Application Data

(60) Provisional application No. 60/772,278, filed on Feb. 10, 2006, provisional application No. 60/737,963, filed on Nov. 18, 2005.

(51) Int. Cl.
*H01S 4/00* (2006.01)
*H01T 11/00* (2006.01)

(52) U.S. Cl. .......................... 29/592.1; 29/825; 29/874; 313/141

(58) Field of Classification Search ................ 29/592.1, 29/825, 874, 875–876; 313/141; 445/7
See application file for complete search history.

(56) References Cited

U.S. PATENT DOCUMENTS 3,803,892 A * 4/1974 Yamaguchi et al. ........... 72/258
3,958,144 A 5/1976 Franks
4,540,910 A 9/1985 Kondo et al.
4,581,558 A 4/1986 Takamura et al.
4,670,684 A 6/1987 Kagawa et al.
5,202,601 A 4/1993 Takamura et al.
RE35,012 E 8/1995 Takamura et al.
5,465,022 A * 11/1995 Katoh et al. ................ 313/144
5,488,262 A 1/1996 Takamura (Continued)

FOREIGN PATENT DOCUMENTS

EP 0435202 A2 7/1991

(Continued)

*Primary Examiner*—C. J Arbes
(74) *Attorney, Agent, or Firm*—Robert L Stearns; Dickinson Wright PLLC

(57) ABSTRACT

A spark plug having a multilayer firing tip that minimizes the amount of precious metal used and a method of assembling a spark plug with a multilayer firing tip. The firing tip includes a discharge end and a weld end, with the weld end being connected to a center electrode, and more specifically to a base electrode on the center electrode. The weld end has a coefficient of thermal expansion, which is not between the values for the coefficients of thermal expansion for the discharge end and the base electrode. More specifically, the weld end has a coefficient of thermal expansion which is greater than the coefficients of thermal expansion for the discharge end and base electrode. The weld end is formed from Nickel and Chromium with a limited amount of additional elements. The spark plug is assembled by providing a first elongated material formed from the material used for the discharge end and a second elongated material formed from a material used for the weld end. The two materials are then joined to form a single joined material and are severed to create a firing tip. The firing tip is welded to the center electrode of the spark plug and more specifically, the base electrode.

24 Claims, 9 Drawing Sheets

U.S. PATENT DOCUMENTS

| | | | |
|---|---|---|---|
| 5,563,469 A | 10/1996 | Takamura et al. | |
| 5,977,695 A | 11/1999 | Osamura et al. | |
| 6,046,532 A | 4/2000 | Matsutani et al. | |
| 6,132,277 A | 10/2000 | Tribble et al. | |
| 6,304,022 B1 | 10/2001 | Matsutani | |
| 6,346,766 B1 | 2/2002 | Kanao et al. | |
| 6,621,198 B2 | 9/2003 | Kanao et al. | |
| 6,676,468 B2 * | 1/2004 | Ishiguro et al. | 445/7 |
| 6,700,317 B2 | 3/2004 | Kanao et al. | |
| 6,710,523 B2 | 3/2004 | Segawa et al. | |
| 6,819,031 B2 | 11/2004 | Hori | |
| 6,844,662 B2 | 1/2005 | Morita et al. | |
| 6,923,699 B2 | 8/2005 | Matsubara et al. | |
| 7,084,558 B2 | 8/2006 | Teramura et al. | |
| 7,086,363 B2 | 8/2006 | Miwa et al. | |
| 7,199,511 B2 * | 4/2007 | Hori | 313/143 |
| 2002/0070646 A1 | 6/2002 | Chiu | |
| 2002/0074920 A1 * | 6/2002 | Chiu et al. | 313/141 |
| 2002/0130602 A1 | 9/2002 | Kanao et al. | |
| 2004/0239223 A1 | 12/2004 | Watanabe | |
| 2004/0263041 A1 | 12/2004 | Tinwell et al. | |
| 2005/0093420 A1 | 5/2005 | Fridrich | |

FOREIGN PATENT DOCUMENTS

| | | | |
|---|---|---|---|
| EP | 1686666 | A1 | 8/2006 |
| JP | 57-55083 | A | 4/1982 |
| JP | 59-40482 | A | 3/1984 |
| JP | 59-98489 | A | 6/1984 |
| JP | 60-262374 | A | 12/1985 |
| JP | 61-230282 | A | 10/1986 |
| JP | 2-207477 | A | 8/1990 |
| JP | 4-366580 | A | 12/1992 |
| JP | 5-205848 | A | 8/1993 |
| JP | 6-60959 | A | 3/1994 |
| JP | 6-84582 | A | 3/1994 |
| JP | 6-111919 | A | 4/1994 |

* cited by examiner

ALIGN
83
81
80
82

JOIN
84
80
82
56

SEVER
90
84
92
92
82
80
56

82
90
80
92
92
56
52
54
50

WELD
42
40
54
50
52
56
44

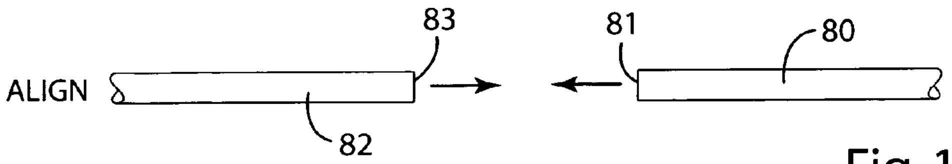
Fig. 13A
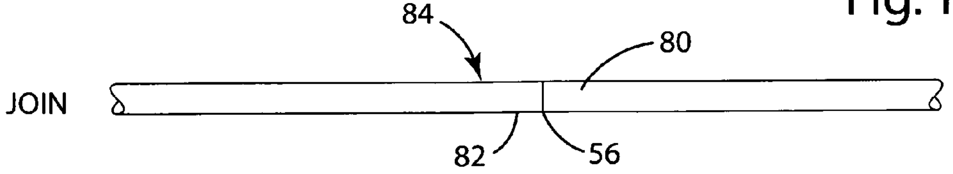
Fig. 13B
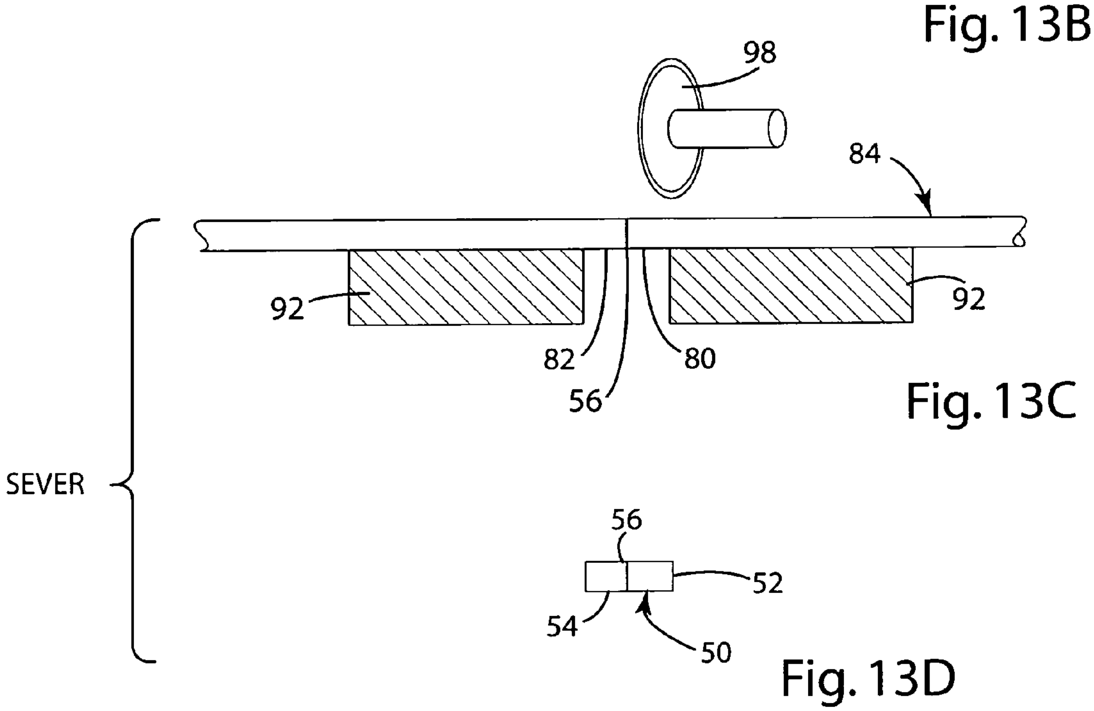
Fig. 13C
Fig. 13D
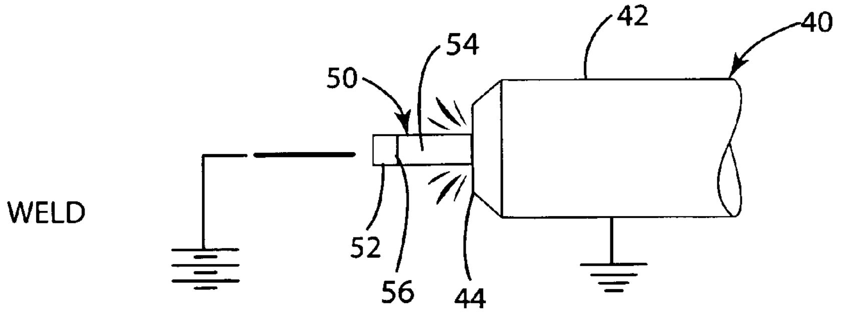
Fig. 13E

METHOD OF FORMING A SPARK PLUG WITH MULTI-LAYER FIRING TIP

CROSS-REFERENCE TO RELATED APPLICATIONS

This application claims priority to U.S. Provisional Application Ser. No. 60/772,278, filed Feb. 10, 2006 and U.S. Provisional Application Ser. No. 60/737,963, filed Nov. 18, 2005, both of which are incorporated herein by reference.

BACKGROUND OF THE INVENTION

1. Technical Field

This invention is directed to spark plugs and other ignition devices used in internal combustion engines and, more particularly, to ignition devices having high performance metal firing tips.

2. Related Art

Spark plugs are well known in the industry and have long been used to initiate combustion in internal combustion engines. In general, a spark plug is a device that extends into a combustion chamber of an internal combustion engine and enables a spark to ignite a combustible mixture of air and fuel therein. Specifically, a spark plug typically includes a cylindrical metal shell having external threads that screw into a portion of the engine and further having a hook shaped ground electrode attached thereto at a firing end of the spark plug. A cylindrical insulator is disposed partially within the metal shell and extends axially beyond the metal shell toward a firing end and also toward a terminal end. A conductive terminal is disposed within the cylindrical insulator at the terminal end of the spark plug, opposite the firing end. At the firing end, a center electrode is disposed within the insulator and projects axially out of the insulator toward the ground electrode, whereby a spark plug gap is defined between the center electrode and the ground electrode.

Due to the very nature of an internal combustion engine, spark plugs are exposed to many extremes occurring within the engine cylinder, including high temperatures and various corrosive combustion gases, which have traditionally reduced the longevity of the spark plug. Spark erosion also reduces the longevity of spark plugs. Spark erosion is where the electrode and in particular the firing tip or a material next to or adjacent to the firing tip erodes away during operation due to localized vaporization due to arc temperatures. Spark plugs traditionally have electrodes formed from Nickel or Nickel alloys which are susceptible to spark erosion. Recently manufacturers have been forming the firing end of the center electrode out of a precious metal such as Platinum, Iridium, or alloys thereof to minimize spark erosion. Platinum, Iridium, and alloys thereof are typically very resistant to spark erosion. However, Platinum, Iridium, and alloys thereof are generally very expensive and it is desirable to minimize the amount of material used to provide the spark portion.

In operation, ignition voltage pulses of up to 40,000 volts are applied through the spark plug to the center electrode, thereby causing the spark to jump the gap between the center and ground electrodes. The spark ignites the air and fuel mixture within the combustion chamber or cylinder to create high temperature combustion to power the engine. Unfortunately, the high voltage and high temperature environment within the combustion chamber can degrade the components of the spark plug, such as through spark erosion. As the spark plug becomes degraded, the characteristic of the spark may become altered thereby degrading the quality of the spark and resulting combustion. While Platinum, Iridium, or other precious metals and alloys thereof are less susceptible to spark erosion, if too small of a piece, either in length, width, or size is used for the precious metal firing tip, the spark may jump around the precious metal tip and arc between the base material of the center electrode and the ground electrode. As the base material is typically a Nickel alloy, it is susceptible to spark erosion which may cause the base material or center electrode to erode away until the precious metal tip falls off. Any degradation of the plug will affect the quality of the spark and any spark that does not originate from the spark surface on the spark portion but instead originates on the center electrode and passes around the precious metal firing tip will degrade the quality of the spark. The quality of the spark effects the ignition of the mixture of air and fuel (i.e., the combustion efficiency, combustion temperature, and combustion products) thus, the power output, fuel efficiency, performance of the engine, and the emissions produced by the combustion of the air and fuel mixture may be adversely affected. Due to the increasing emphasis on regulating emissions for motor vehicles, increasing fuel prices, and modem performance demands it is desirable to maintain a high quality spark for consistent engine performance and emission quality.

The longevity of the spark plug and thereby resistance of the spark plug to spark erosion is also important to manufacturers. Manufacturers are increasingly requiring longer service lifetimes from spark plugs such as 100,000 mile, 150,000 mile, and 175,000 mile service lifetimes. Many traditional Nickel spark plugs only have service lifetimes of 20,000 to 40,000 miles due to spark erosion and corrosion. Furthermore, many manufacturers are increasing the compression within an engine cylinder to provide a more fuel efficient engine. Any increase in compression also requires an increase in operating voltage of the spark plug to sufficiently allow the spark to jump the spark gap between the center and ground electrodes. Any increase in the operating voltage of a spark plug also increases the likelihood of spark erosion and therefore reduces the longevity of the spark plug. One method to combat spark erosion is to significantly increase the amount of precious metal material such as Iridium, Platinum, or alloys thereof forming the tip spark portion or size of the firing tip. However, Iridium, Platinum, and alloys thereof are extremely expensive and as manufacturers continually demand cost reductions, it becomes important to minimize the amount of Iridium, Platinum, or alloys thereof used in spark plugs.

Furthermore, in manufacturing spark plugs having spark portions formed out of Iridium, Platinum, or alloys thereof, attachment of the spark portion to the center electrode base material may be difficult. The Iridium and Platinum alloys tend to be dissimilar in properties and are sometimes difficult to reliably weld to the base material of the center electrode. Additionally Iridium and its alloys are often very brittle causing difficulty in processing and attachment to the base material.

SUMMARY OF THE INVENTION

In view of the above, the present invention is directed to multilayer firing tip for a spark plug that minimizes the amount of precious metal used while providing sufficient resistance to spark erosion and corrosion, an intermediate material that is resistant to sparking and a method of assembling a spark plug with the multilayer firing tip.

The spark plug includes a firing tip having a discharge end and a weld end. The weld end is connected to a center electrode, and more specifically a base electrode on the center electrode. The weld end has a coefficient of thermal expansion, which is not between the values for the coefficients of thermal expansion for the discharge end and the base electrode. More specifically, the weld end has a coefficient of thermal expansion which is greater than the coefficients of thermal expansion for the discharge end and base electrode.

The spark plug includes a firing tip having a discharge end and a weld end. The weld end includes a material that is formed from Nickel and Chromium with a limited amount of additional elements. The weld end includes less than 20% Iridium or Platinum and less than 3% Rhodium. The weld end in some embodiments may also include Iron, Carbon, Manganese, Silicon, Copper, Aluminum, and Rhenium.

The spark plug may be assembled by providing a first elongated material formed from the material used for the discharge end and a second elongated material formed from a material used for the weld end. The two materials are then joined to form a single joined material and then are severed to create a firing tip. The firing tip is welded to the center electrode of the spark plug and more specifically, the base electrode.

Further scope of applicability of the present invention will become apparent from the following detailed description, claims, and drawings. However, it should be understood that the detailed description and specific examples, while indicating preferred embodiments of the invention, are given by way of illustration only, since various changes and modifications within the spirit and scope of the invention will become apparent to those skilled in the art.

BRIEF DESCRIPTION OF THE DRAWINGS

The present invention will become more fully understood from the detailed description given here below, the appended claims, and the accompanying drawings in which:

FIGS. 13A-13E represent in simplified form a manufacturing method of the present invention.

DETAILED DESCRIPTION OF THE PREFERRED EMBODIMENT

Figure 1:
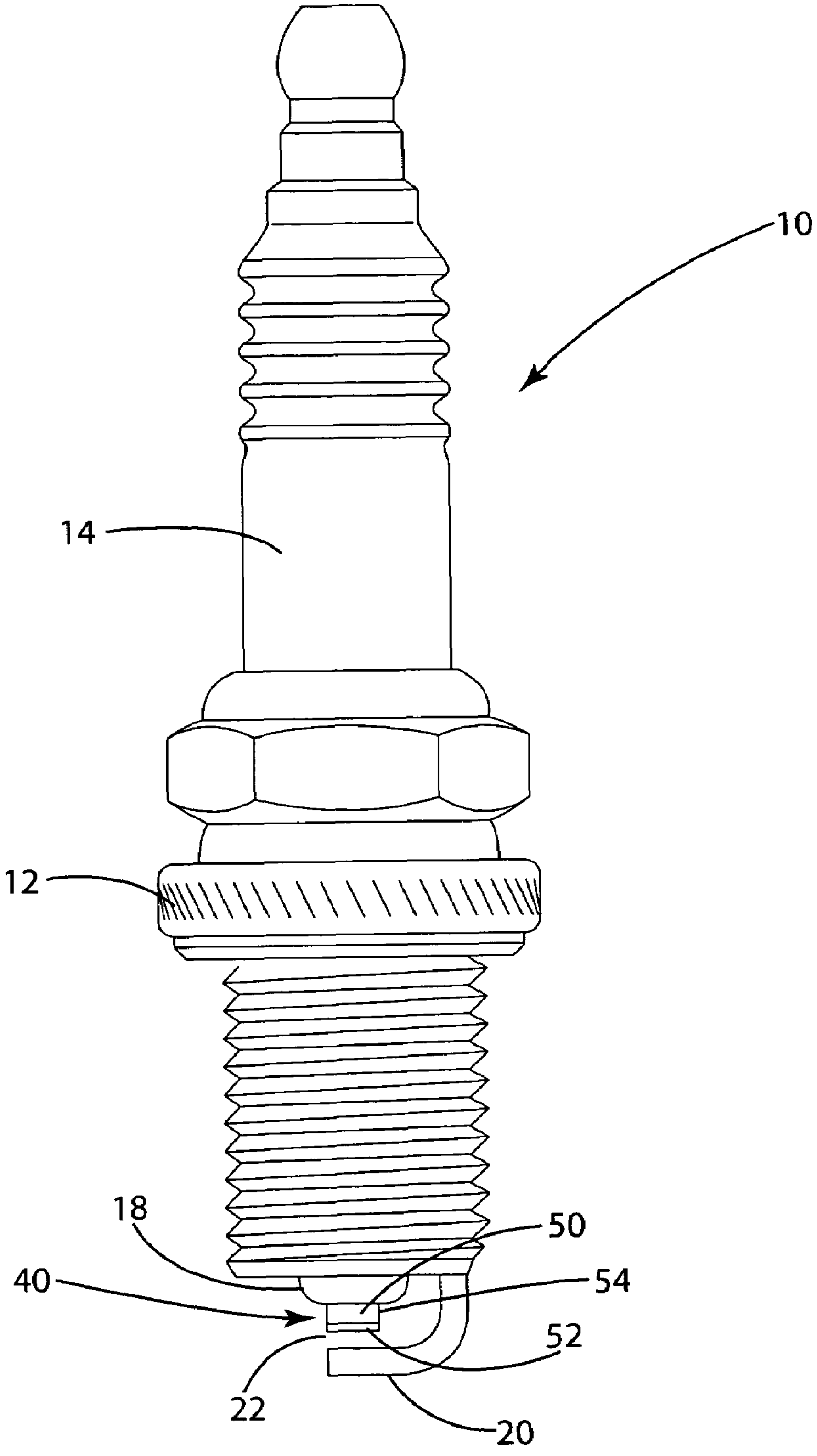
FIG. 1 is a front elevational view of a typical spark plug.
Figure 2:
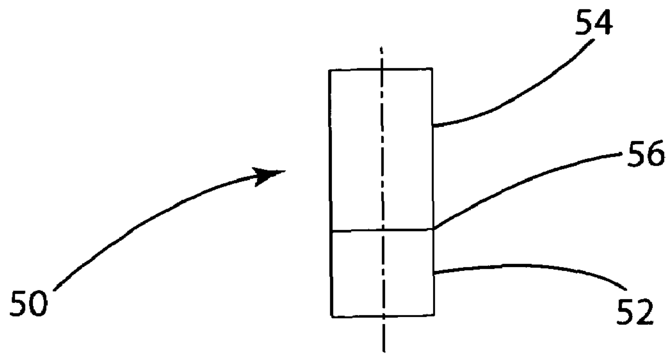
FIG. 2 is a front elevational view of a firing tip.
Figure 3:
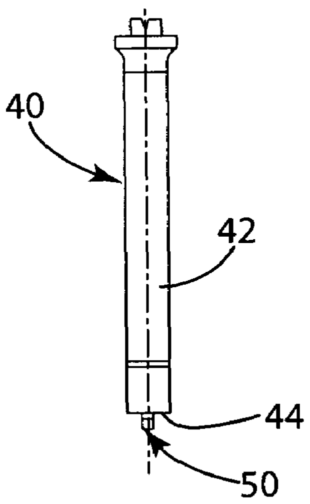
FIG. 3 is a front elevational view of a center electrode assembly including firing tip.
Figure 4:
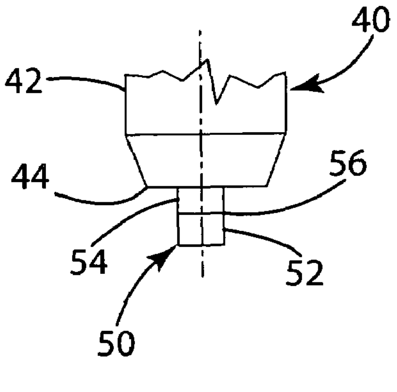
FIG. 4 is an enlarged partial front elevational view of the firing end of the center electrode assembly.
Figure 5:
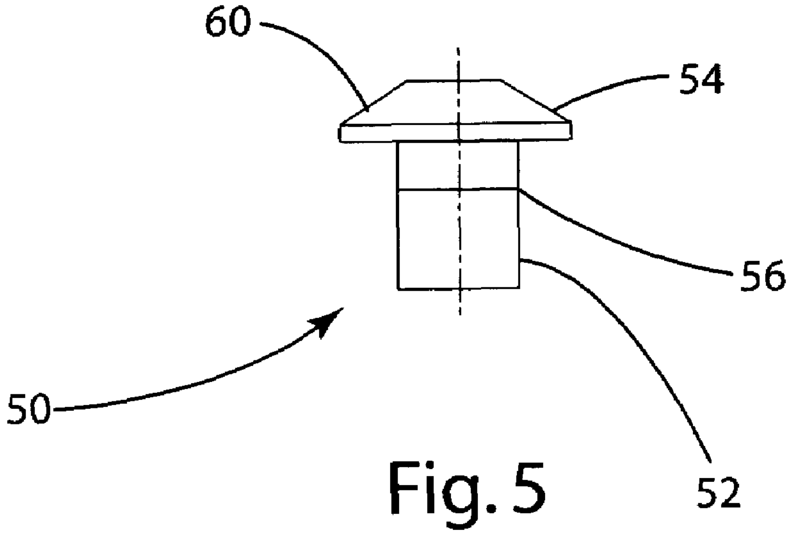
FIG. 5 is a front elevational view of a firing tip with a rivet head.
Figure 6:
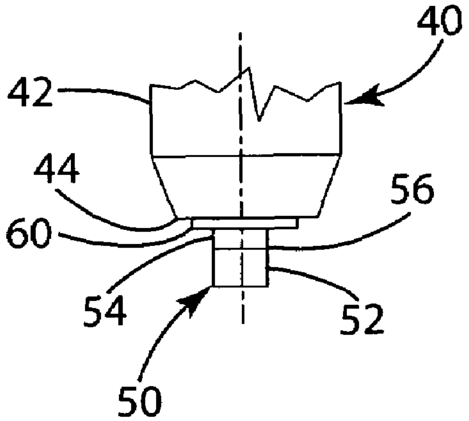
FIG. 6 is a partial front elevational view of the center electrode assembly with a rivet head firing tip.

The present invention relates generally to ignition devices such as spark plug igniters and other spark generation devices. A spark plug 10 is illustrated in front elevational view in FIG. 1. The spark plug 10 includes an outer metallic shell 12 secured to an insulator 14. The outer metallic shell 12 is attached to a ground electrode 20. The insulator 14 has a central bore (not shown) in which a center electrode assembly 40 is situated. The center electrode 40 extends at a firing end 44 beyond the insulator 14 and more specifically beyond the insulator core nose 18. At the firing end 44 of the center electrode assembly 40 a base electrode 42 is situated to which a firing tip 50 is attached facing the ground electrode 20.

The base electrode 42 as illustrated in the figures extends partially into the combustion chamber and therefore is formed from an alloy that is substantially resistant to corrosion and oxidation. Base electrodes are commonly formed from alloys that include Nickel. Additional elements may be added to the base electrode, such as Chromium, Silicon, Manganese, Titanium, Zirconium, Carbon, Iron, Yttrium, Aluminum, Manganese, Calcium, Copper, Sulfur, Vanadium, Niobium, Molybdenum, Tungsten, Cobalt, Phosphorus, and Lead. One such Nickel alloy includes less than 2% Silicon and Aluminum and less than 0.5% Yttrium, Iron, Chromium, Carbon, Titanium, Manganese, Calcium, Copper, Sulfur, Phosphorus, Vanadium, Niobium, Molybdenum, Tungsten, and Cobalt. Another acceptable Nickel alloy includes less than 3% Chromium and Manganese and less than 1% Silicon, Titanium, Zirconium, Carbon, and Iron. Another acceptable Nickel alloy includes less than 20% Chromium, less than 10% Iron and less than 1% Manganese, Silicon, Magnesium, Aluminum, Cobalt, Niobium, Carbon, Copper, Molybdenum, Phosphorus, Titanium, Sulfur and Lead.

Figure 7:
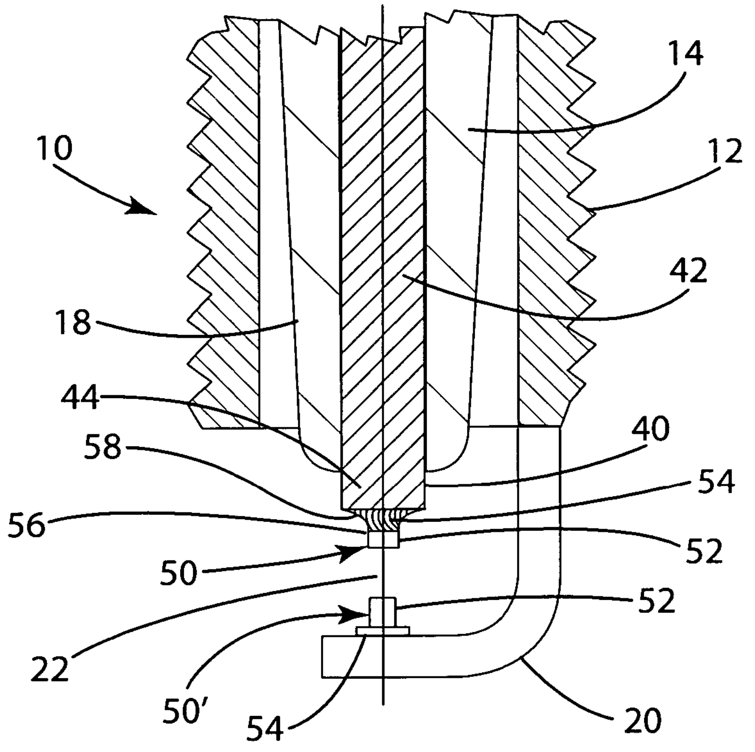
FIG. 7 is a partial sectional view of a spark plug with firing tips attached to both the center and ground electrodes.
Figure 8:
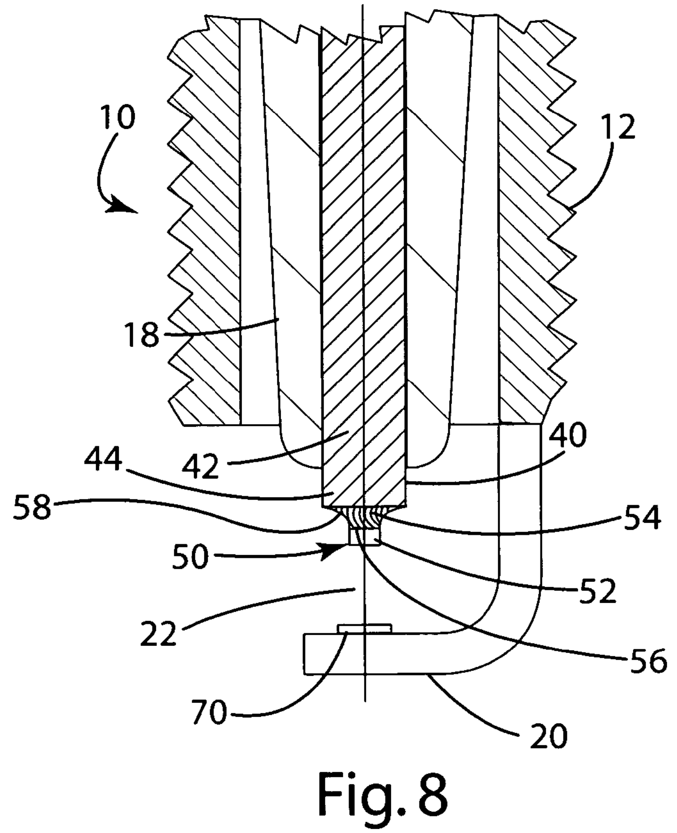
FIG. 8 is a partial sectional view of an alternative spark plug.

The firing tip 50 is attached to the base electrode 42. The firing tip 50 faces the ground electrode 20 and during operation a spark is created in the spark gap 22 between the firing tip 50 and the ground electrode 20. The firing tip 50 is formed from two distinct materials. More specifically the firing tip 50 includes a discharge end 52 and a weld end 54. The discharge end 52 is welded to the weld end 54 at a weld 56. The firing tip 50 may also be welded to the base electrode 42 with a weld pool 58 as illustrated in FIGS. 7 and 8.

The discharge end 52 is formed from a material that is resistant to spark erosion and also typically resistant to corrosion. Materials resistant to spark erosion generally include Iridium (Ir), Platinum (Pt), Palladium (Pd), Rhodium (Rh), Ruthenium (Ru), Rhenium (Re), or alloys thereof. The inventors have found that Platinum and Iridium or alloys thereof due to their general availability and ease of manufacture as well as resistance to spark erosion and corrosion currently provide the best balance of desirable characteristics. Discharge ends 52 formed of Iridium alloys typically include other elements such as elements selected from the group consisting of Platinum, Palladium, Rhodium, Ruthenium, Rhenium, Copper (Cu), Chromium (Cr), Vanadium (V), Zirconium (Zr), Nickel (N), and Tungsten (W).

An exemplary Iridium alloy suited for use as the discharge end 52 generally includes at least 90% Iridium, Platinum, or a combination thereof with less than 5% Rhodium, less than 3% Tungsten, less than 3% Zirconium, and less than 10% other materials. Another exemplary Iridium alloy suited for the discharge end 52 includes more than 90% Iridium, less than 3% Rhodium, less than 1% Tungsten, and less than 1% Zirconium. The Iridium alloy as described above generally has a coefficient of thermal expansion of approximately less than 7 1/° C.$\times 10^{-6}$ at 20° C.

The discharge end 52 is attached to the weld end 54 to form the firing tip 50. The discharge end 52 and weld end 54 are generally attached by a weld 56 or any other means. The weld end 54 is generally formed from a Nickel alloy and has a thermal expansion coefficient greater than the thermal expansion coefficients of the discharge end 52 and base electrode 42. The inventors have surprisingly found that unlike the prior art which requires intermediate members, such as the weld end 54, to have a thermal expansion coefficient somewhere between the surrounding ends, such as the discharge end 52 and base electrode 42, that a thermal expansion coefficient higher than the surrounding members provides a material well suited for intermediate members and as a spark plug material well suited for use in the combustion chamber. The materials with the given relationships of coefficients of thermal expansion form welds that have acceptable longevity, have the desired characteristics of an intermediate member and the desirable characteristics to resist corrosion and spark erosion. The present invention has found that certain alloys with thermal expansion coefficients that are greater than the thermal expansion coefficients of the base member and discharge end by at least 5% provide desirable characteristics as an intermediate member. The thermal expansion coefficient of the weld end 54 is greater than 13.5, specifically greater than 14 and more specifically greater than 14.5. The inventors have found that an alloy of Nickel and Chromium having a thermal expansion coefficient of approximately 14.5-15 provides desirable characteristics for an intermediate member in a spark plug, specifically an intermediate member forming a portion of the firing tip 50 of the spark plug 10.

Alloys for the weld end 54 include Nickel and Chromium with at least one element selected from the group consisting of, Copper, Vanadium, Zirconium, Tungsten, Osmium (Os), Gold (Au), Iron (Fe), Cobalt (Co), and Aluminum (Al). Based upon testing of some combinations of the above elements, it is expected that all of the above potential combinations will provide sufficient corrosion resistance, longevity, and the ability to be securely welded to the base electrode and the discharge end 52 over the lifetime of the spark plug. Furthermore, it has been surprisingly found that the weld end 54 having less than 20% by weight of Platinum, Iridium, Ruthenium, Rhenium, and Rhodium, provides desirable characteristics of an intermediate member while reducing the amount of precious metals used. Furthermore, an alloy having less than 10% of Platinum, Iridium, Ruthenium, Rhenium, and Rhodium has been found to have acceptable characteristics. Even alloys with less than 5% and more specifically less than 3% of any elements selecting from the group consisting of Platinum, Iridium, Ruthenium, Rhenium, and Rhodium and less than 5% of any combination thereof provides desirable characteristics for an intermediate member while reducing to a minimum the amount of precious metals used. The alloy for the weld end 54 generally includes both Nickel and Chromium with approximately less than 2% of any element selected from the group consisting of Iron, Platinum, Iridium, Ruthenium, Rhenium, Rhodium, Magnesium (Mg), Manganese (Mn), Aluminum, Silicon (Si), Zirconium, Tungsten, Vanadium, Osmium, Gold, Copper, and Cobalt. Furthermore, it has been found that an alloy with 15 to 45% Chromium, less than 20% other elements, less than 10% of any precious metal such as Platinum, Iridium, Ruthenium, Rhenium, and Rhodium with the balance of the alloy being Nickel provides an excellent intermediate member. More specifically, the weld end 54 in the preferred embodiment is formed of an alloy having Chromium between 15 and 45% , less than 1% Iron, less than 0.1% Carbon, less than 1% Manganese, between 0.5 and 2% Silicon, less than 0.5% Copper, less than 0.2% Aluminum, and less than 0.1% Rhenium with the balance being Nickel. The weld member 54 may be further formed of an alloy having Chromium between 19 and 21% , less than 1% Iron, less than 0.08% Carbon, less than 1% Manganese, between 1.0 to 1.5% Silicon, less than 0.5% Copper, less than 0.2% Aluminum, and less than 0.04% Rhenium, with the balance being Nickel for an excellent intermediate alloy material with a thermal expansion coefficient of approximately 14.5 to 15 1/° C.$\times 10^{-6}$ at 20° C.

The following is an exemplary method of assembling the spark plug 10 with attached firing tip 50. One skilled in the art would understand how to generally assemble the metallic shell 12 to the insulator 14 with the ground electrode 20 and the center electrode assembly 40 within the insulator 14. Any known method can be used to assembly the base components of the spark plug and the following method only deals with the formation of the firing tip 50 and the subsequent attachment of the firing tip 50 to the base electrode 44 of the center electrode 40.

A first elongated material 80 to form the discharge end 52 is provided. A second elongated material 82 to form the weld end 54 is provided. The elongated materials 80 and 82 are provided in a form such as a wire or rod. The first elongated material 80 is provided and formed from an alloy or the specific material suitable to form the discharge end 52 as described above. The second elongated material 82 is also provided and formed of a suitable material or alloy to provide the weld end 54 as described above. The first elongated material 80 has a first end 81 and the second elongated material 82 has a second end 83.

The first end 81 and second end 83 are butted together and then tack welded, such as with a laser. The butted ends 81 and 83 are then further welded about the circumference of the butt so that a sufficient weld is provided to keep the discharge end 52 attached to the weld end 54 through the operational life of the spark plug 10. In the preferred embodiment, the complete circumference of the butted ends 81 and 83 are welded together such as by laser weld, resistance weld, EB weld, brazing, friction welding, stir welding, or any other method of attaching two materials together. In some embodiments, the tack welding step may be eliminated and the circumferential weld may be performed immediately. In other embodiments the two ends may be friction welded together such as by spinning one of the first and second materials 80 or 82 relevant to the other of the first and second materials 80 or 82 so that the butted ends 81 and 83 become welded together at the weld joint 56.

Figures 9A, 9B, 9C, 9D, 9E:
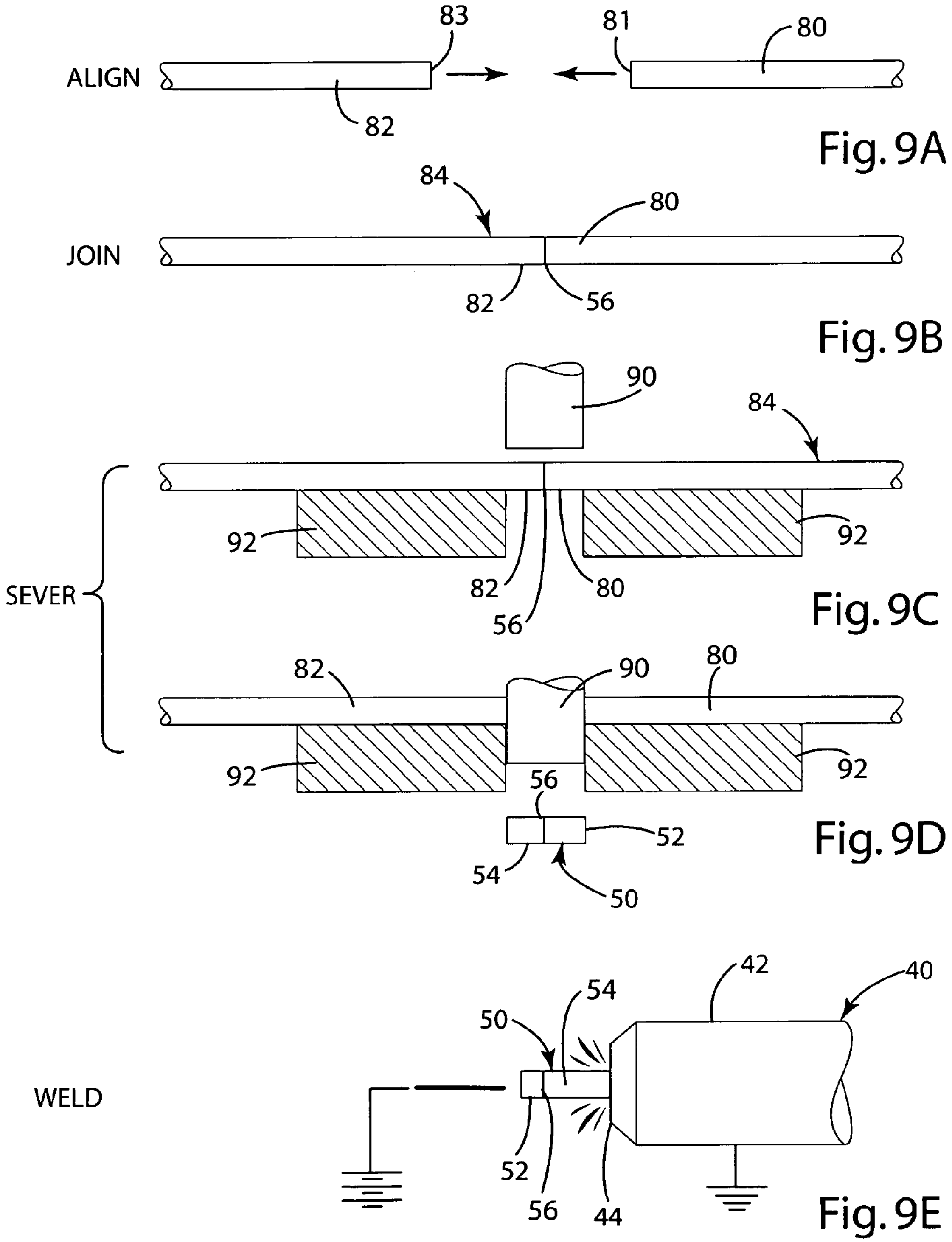
FIGS. 9A-9E depict in simplified form a method of manufacturing a spark plug center electrode with a multi-layer firing tip.
Figures 12A, 12B, 12C, 12D, 12E, 12F:
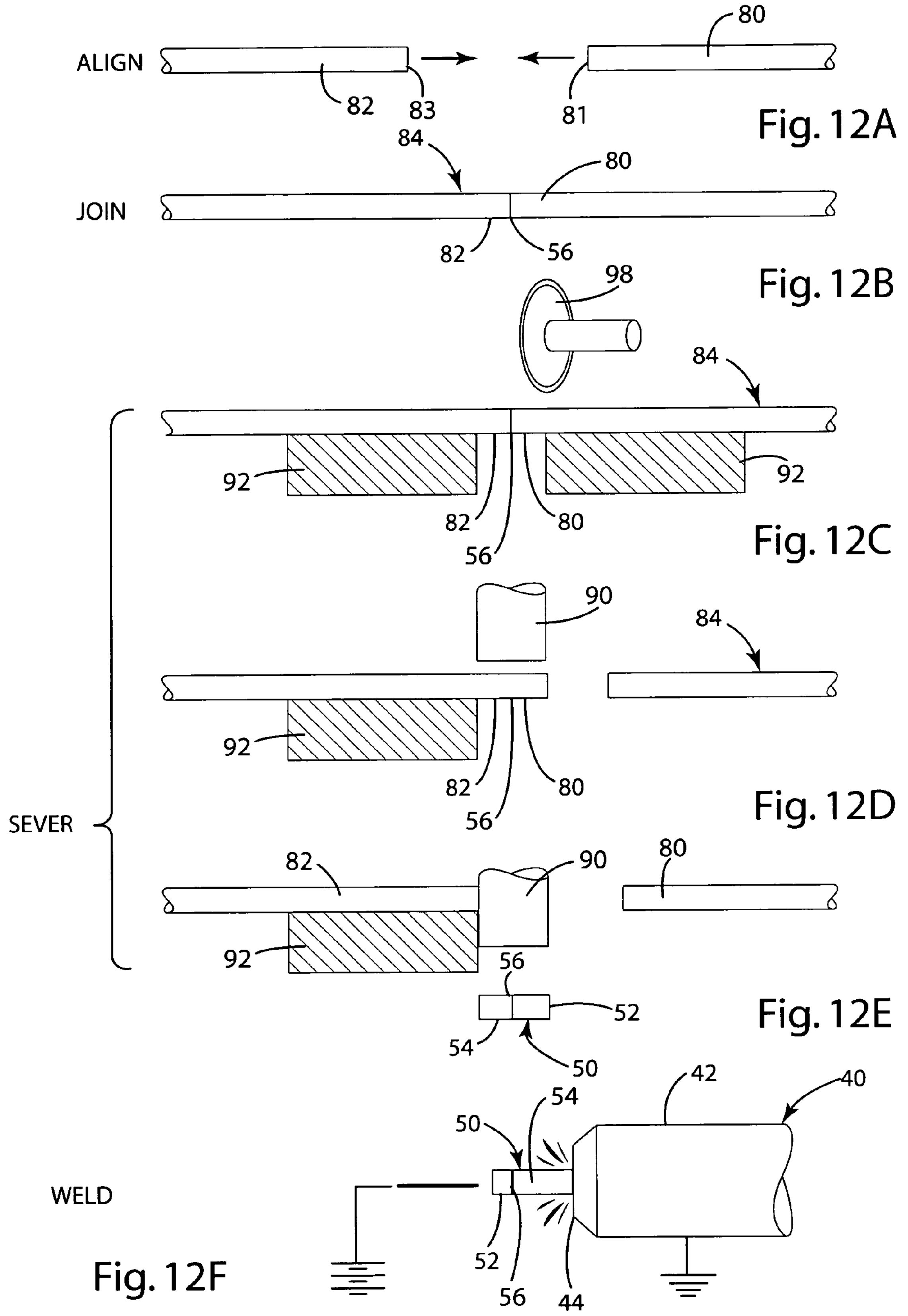
FIGS. 12A-12F represent in simplified form a manufacturing method according to the present invention.

After the butted ends 81 and 83 are welded together at the weld joint 56 as illustrated in FIGS. 9B, 12B, and 13B, a portion of the combined materials including the weld 56 is severed to form the firing tip 50. The process of severing may be done through a punch 90 and die 92 as illustrated in FIGS. 9C and 9D, a cutting operation as illustrated in FIG. 12C and then a punch as illustrated in FIGS. 12D and 12E, or a two part cutting operation as illustrated in FIG. 13C. While the cutting operation is illustrated as being performed by a saw blade 98, the combined material 84 may be severed by any means such as a laser, abrasion, diamond saw, metal band saw, or any other method of severing two metallic members from each other to form a discharge end 52 acceptable to be used as a spark surface in a spark plug and a weld end 54 with a surface acceptable for welding to the base electrode 42. While each of the drawings illustrates a single joined elongated material 84 such as a single joined wire 84 as being individually severed, although not illustrated, the inventors have found it preferable to join a multitude of elongated materials to form a bundle of a multitude of joined materials 84. The bundle may then be severed in bulk, such as by a diamond saw cutting through the bundle and severing one of the first and second materials 80 or 82 from the joined material 84. The firing tip then may be severed from the other material 80 or 82 such as by a punch or saw. While currently the inventors have found the most efficient way of assembling and manufacturing the firing tip 50 on a spark plug is to join and then bundle the joined materials 84 into a bundle of between fifty and one hundred individual joined wires 84 and then sever the firing tip from the joined material 84 with a diamond saw 98, it is believed that with additional manufacturing equipment specifically designed for handling the tiny firing tips 50, punching may be a more efficient method of assembly. For example, a single machine that performs the punching, as illustrated in FIGS. 9C and 9D as well as FIGS. 12D and 12E, and then grabs the firing tip 50 after being punched and automatically welds it in place on a spark plug 10 or center electrode assembly 40 may be a more efficient method of assembly.

After the individual firing tips 50 have been severed so that the firing tip 50 includes a portion of the first material 80 and the second material 82, which respectively form the discharge end 52 and weld end 54 with the weld 56 therebetween, the welded piece (firing tip 50) is then grabbed for assembly to the base electrode 42. It should be recognized that while the drawings illustrate the weld 56 being approximately in the center of the firing tip 50, to reduce material cost the discharge end 52 may be made significantly smaller than the weld end 54. This would still allow a discharge end 52 to be provided that is sufficiently robust against spark erosion while providing a weld end 54 that is more resistant to corrosion.

Minimizing the size of the discharge end 52, not only reduces the material cost, but also minimizes the effect of corrosion on the discharge end 52. For example, an Iridium alloy discharge end 52 may be susceptible to specific types of corrosion in the combustion chamber of an internal combustion engine. As Iridium has a high melting point, it is also highly resistant to oxidation and corrosion. However, as vehicle manufacturers have been increasing compression and operating temperatures of engines to improve fuel economy, it has been found that Iridium has a very volatile oxidation state at high temperatures, such as at the upper end of the operating range of the spark plug. As higher compression engines require more power to be supplied through the plug to force the spark to jump the gap between the center electrode 40 and the ground electrode 20, the operational temperature of the spark plug 10 has been increasing. At high temperatures, an Iridium discharge portion 52 of a spark plug 10 may experience severe corrosion. This corrosion is believed to occur when at high temperatures Calcium and/or Phosphorus react with Iridium to cause corrosion and erosion of the discharge end 52. The presence of Calcium and Phosphorus in combustion materials is relatively a more recent development as many manufacturers attempt to increase fuel economy by allowing more oil to seep into the combustion chamber to reduce friction. Calcium and Phosphorous are primarily present in engine oils and particularly in oil additives. It is believed that Calcium and Phosphorus in the presence of Oxygen during combustion within the engine cylinder react with Iridium to form a volatile compound that evaporates and results in a loss of Iridium on the discharge end 52. More specifically, it is believed that gaseous Calcium during the combustion and exhaust cycle condenses on the Iridium discharge portion of the spark plug and more particularly the sides of the discharge portion of the firing tip 50. It is known that molten Calcium dissolves Iridium and that Iridium is vulnerable to oxidation in the presence of Phosphorus. Therefore, the compound formed after the Phosphorus and oxygen react with the dissolved Calcium Iridium mixture is very volatile and subject to evaporation which results in the loss of Iridium on the discharge portion. Typically this erosion occurs on the sides of the discharge portion and not the spark surface thereby minimizing the amount of material used in the discharge end 52 provides a discharge end 52 that is highly resistant to spark erosion while yet having minimal surface area that is susceptible to corrosion. More specifically it is found that the sparking on the spark surface keeps the Iridium free of corrosion. Similar concerns occur with Platinum which may have various growths which eventually may interfere with the spark gap thereby reducing performance of the spark plug.

Thereby when the firing tip 50 is severed from the joined materials 84, the method of severing may allow for a very minute amount of Iridium discharge portion to be used that is welded onto the weld end 54. This allows for a much smaller quantity in height and length than would typically be able to be easily processed in a manufacturing setting when directly welding a small piece of precious metal such as Iridium to a firing tip. The method of the present invention also provides for a more secure weld than can typically be accomplished if a small piece of the discharge end is welded to the weld end, especially for hard to weld materials such as Iridium. More specifically, the firing tip 50 can be severed with a very minute portion forming the discharge end with the bulk of the firing tip 50 being formed from the weld end 54. By using the process of the present invention, the amount of Iridium used to form a discharge end 52 is much smaller than as if the firing tip 50 was individually welded as separate components. This also allows the effects of corrosion of Iridium to be minimized.

Figure 10A:
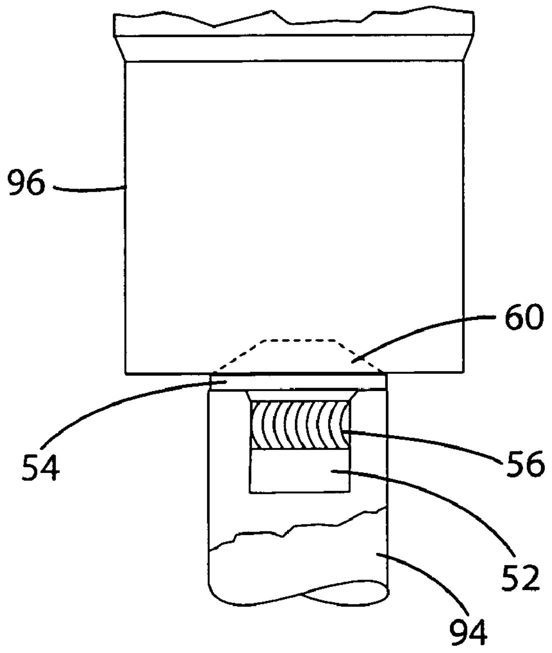
FIGS. 10A-10B represent additional steps for the manufacturing method in FIGS. 9A-9E.
Figure 10B:
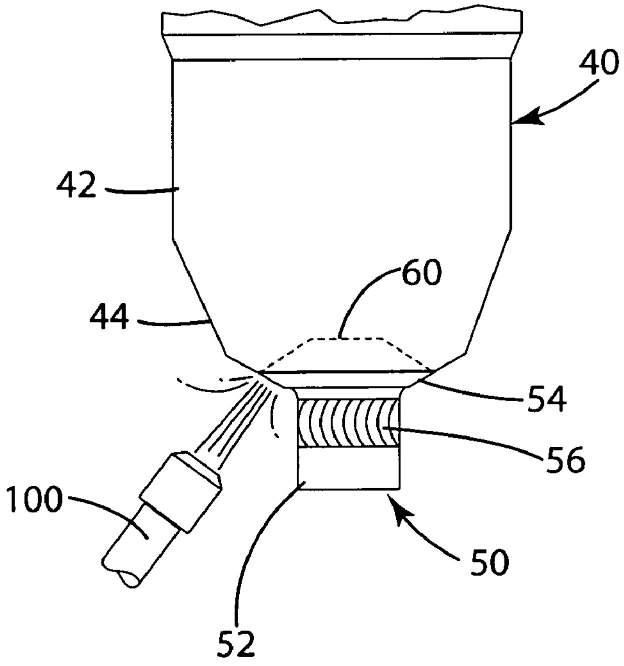
Figure 11:
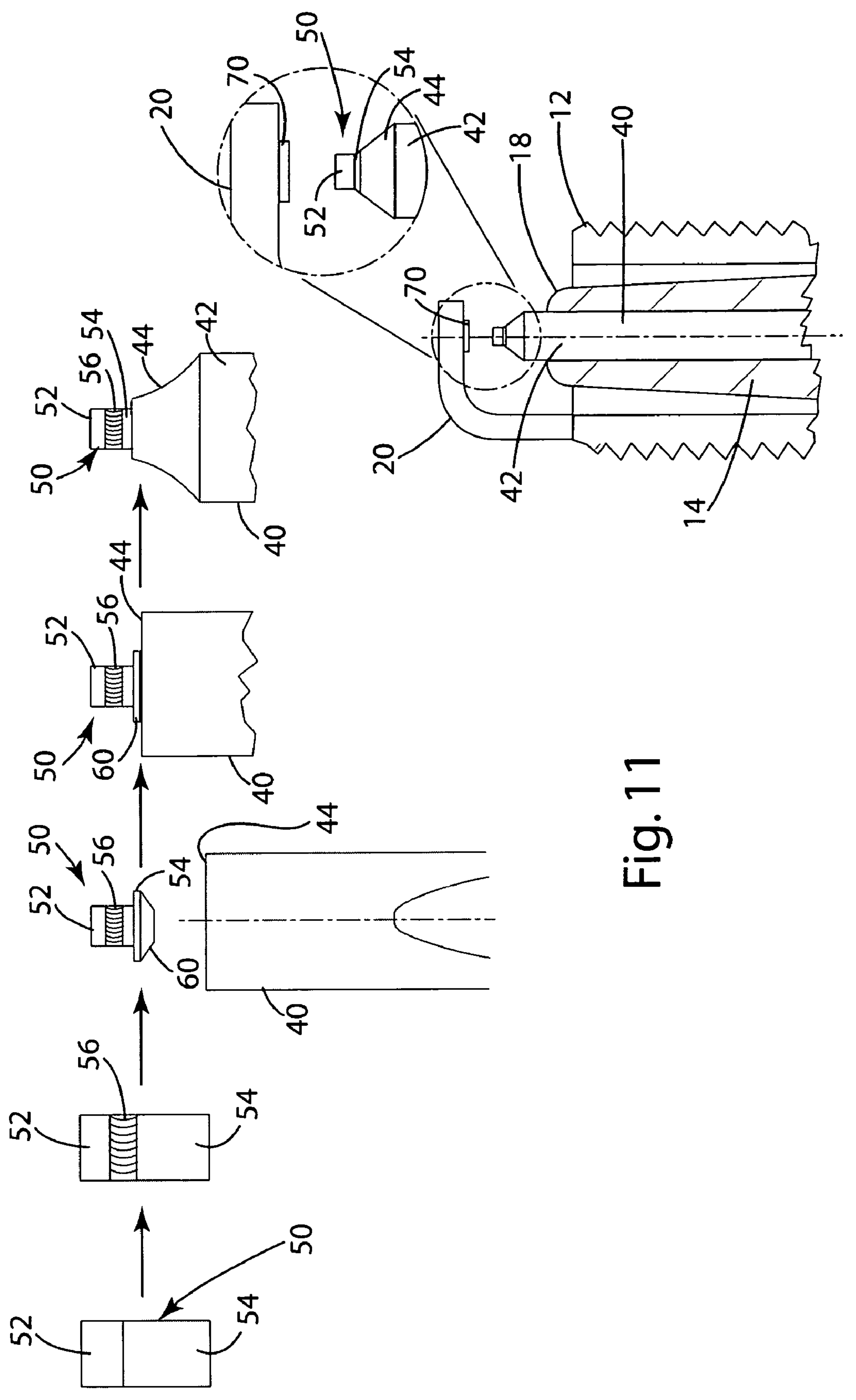
FIG. 11 represents a progression of the assembly process.

Once the firing tip 50 is severed from the joined materials 84, it is picked up and then assembled onto the spark plug. Of course before assembly onto the spark plug 10 certain optional assembly steps may occur. To provide a better bond between the base electrode 42 and the weld material 54, certain processing operations may be performed to the firing tip 50, such as adding a rivet head 60 to the weld end 54 as illustrated in FIG. 10A. One way to add a rivet head 50 to the firing tip 50 is to line up the firing tip 50 with a heading die 96 and push the firing tip 50 into a heading die 96. The firing tip 50 is supported by a punch 94 which then pushes the firing pin 50 into the heading die 96 to form the rivet head 60. The punch 94 may also be formed in a hollow fashion with a kick out pin (not shown) which is pushed into the Iridium end to cause the weld end 54 to deform and be headed into a rivet 60. By supporting the Iridium portion with the punch 94, the discharge end 52 is prevented from shattering as Iridium and other precious alloys generally are very brittle. The firing tip 50 may then be attached as illustrated in FIG. 10B and FIG. 11 by placing the rivet head 60 into a cavity on the base electrode 42 and then welding such as by a laser 100. Other processing steps may also occur to further form the base electrode 42 and more specifically the firing end 44 of the center electrode assembly 40.

If the firing tip 50 is not formed with a rivet head 60, the firing tip 50 may be directly attached to the base electrode 42 and welded thereto such as by resistance welding as shown in FIG. 9E. Of course laser welding and other methods of welding may be used.

451 As illustrated in FIG. 11, a noble metal chip 70 may also be added to the ground electrode 20. Also as illustrated in FIG. 7, the firing tip 50 may be attached to the ground electrode 20. More specifically, FIG. 7 illustrates a secondary firing tip 50' with a riveted head 60 directly opposing the firing tip 50 attached to the center electrode. By putting two firing tips, one on the center electrode and one on the ground electrode with their discharge ends facing each other, the performance of the spark plug may be improved.

The foregoing discussion discloses and describes an exemplary embodiment of the present invention. One skilled in the art will readily recognize from such discussion, and from the accompanying drawings and claims that various changes, modifications and variations can be made therein without departing from the true spirit and fair scope of the invention as defined by the following claims.

What is claimed is:

1. A method of forming spark plug having a center electrode, said spark plug comprising:

providing a first elongated material, said first elongated material being formed from at least one element selected from the group consisting of Platinum, Palladium, Rhodium, Iridium, Ruthenium, and Rhenium;

providing a second elongated material, said second elongated material being formed from at least one element selected from the group consisting of Nickel, Chromium, Vanadium, Zirconium, Tungsten, Osmium, Gold, Iron, Cobalt, and Aluminum;

joining said first elongated material to said second elongated material;

severing a portion of said joined first and second elongated materials to form a firing tip, said firing tip including a portion of said first and second elongated materials; and thereafter assembling said firing tip to the center electrode.

2. The method of claim 1 wherein said step of severing includes the step of cutting said firing tip from said joined first and second elongated materials.

3. The method of claim 1 wherein said step of severing includes the step of severing said first elongated material from said second elongated material so that said second elongated material has a portion of said first elongated material joined to said second elongated wire.

4. The method of claim 3 wherein said step of severing said first elongated material from said second elongated material is performed by cutting.

5. The method of claim 4 wherein said step of cutting said first material is performed by a saw, abrasion or laser.

6. The method of claim 3 further including the step of severing said second elongated wire to form said firing tip after severing said first elongated wire.

7. The method of claim 6 wherein said step of severing said second elongated wire is performed by saw, abrasion, laser or punch.

8. The method of claim 7 wherein said saw is a diamond saw.

9. The method of claim 1 wherein said step of joining is performed by welding said first elongated material to said second elongated material.

10. The method of claim 9 wherein said welding is performed by laser welding, resistance welding, EB welding, brazing, friction welding, and stir welding.

11. The method of claim 1 further including the step of bundling a plurality of joined first and second elongated materials after said step of joining said first and second elongated materials and before said step of severing a portion of said first and second elongated materials.

12. The method of claim 11 wherein said bundled plurality of joined first and second elongated materials includes at least 50 joined first and second elongated materials.

13. The method of claim 11 wherein said step of severing a portion of said joined first and second elongated materials includes the step of severing said bundled plurality of joined first and second elongated materials to produce a plurality of individual tips in a single severing operation.

14. The method of claim 13 wherein said step of severing is performed by cutting.

15. The method of claim 14 wherein said cutting is performed by a diamond saw.

16. The method of claim 1 wherein said step of assembling said firing tip to the center electrode includes the step of welding said firing tip to the center electrode.

17. The method of claim 16 wherein said step of assembling said firing tip to the center electrode further includes the step of welding said portion of second elongated material to the center electrode.

18. The method of claim 1 wherein said step of severing is performed with a punch.

19. The method of claim 1 further including the step of creating a head on said portion of second elongated material on the severed firing tip, after said step of severing and before said step of assembling.

20. The method of claim 19 further including the step of forming a recess on the center electrode and wherein said step of assembling further includes the steps of inserting said head into said recess and welding said head to the center electrode.

21. The method of claim 1 wherein said severed firing tip includes a greater percentage of said second material than said first material by weight.

22. A method of forming spark plug having a center electrode, said spark plug comprising:

providing a first elongated material;

providing a second elongated material;

joining said first elongated material to said second elongated material;

severing a portion of said joined first and second elongated materials to form a firing tip, said firing tip including a portion of said first and second elongated materials, said portion of said second elongated material being greater by weight than said portion of said first elongated material; and thereafter assembling said firing tip to the center electrode.

23. The method of claim 22 further including providing the first elongated material having a first end;

providing the second elongated material having a second end; and performing the joining step by welding said first end to said second end.

24. The method of claim 23 further including performing the welding by rotating the first and second elongated materials and forming a circumferential weld about the first and second materials.

* * * * *